United States Patent [19]

Yonezawa

[11] Patent Number: 4,791,627
[45] Date of Patent: Dec. 13, 1988

[54] WOBBLED PIT RECORDING METHOD AND DEVICE OF OPTICAL RECORDING MEDIUM UTILIZING A PLURALITY OF TIME DIFFERENT SIGNAL WAVEFORMS

[75] Inventor: Seiji Yonezawa, Hachioji, Japan
[73] Assignee: Hitachi, Ltd., Tokyo, Japan
[21] Appl. No.: 818,174
[22] Filed: Jan. 13, 1986

[30] Foreign Application Priority Data

Jan. 25, 1985 [JP] Japan .................................. 60-10854

[51] Int. Cl.[4] ...................... G11B 7/125; G11B 7/095
[52] U.S. Cl. ........................................ 369/109; 369/44
[58] Field of Search .................. 369/109, 44, 46, 111; 346/108, 76 L

[56] References Cited

U.S. PATENT DOCUMENTS

| | | | |
|---|---|---|---|
| 3,635,545 | 1/1972 | Vankerkhove et al. | 369/109 |
| 3,919,697 | 11/1975 | Walker | 360/77 |
| 4,057,833 | 11/1977 | Braat | 369/46 |
| 4,223,187 | 9/1980 | Yonezawa et al. | 369/121 |
| 4,428,075 | 1/1984 | Hazel et al. | 369/275 |
| 4,443,870 | 4/1984 | Hazel et al. | 369/275 |
| 4,449,215 | 5/1984 | Reno | 369/111 |
| 4,459,690 | 7/1984 | Corsover et al. | 369/46 |
| 4,541,082 | 9/1985 | Horikoshi et al. | 369/44 |
| 4,553,228 | 11/1985 | Gerard et al. | 369/46 |
| 4,561,082 | 12/1985 | Gerard et al. | 369/46 |
| 4,562,564 | 12/1985 | Bricot et al. | 369/46 |
| 4,564,929 | 1/1986 | Yonezawa et al. | 369/44 |

FOREIGN PATENT DOCUMENTS 0021411 1/1981 European Pat. Off. ............ 369/109

OTHER PUBLICATIONS

Terman, "Radio Engineers' Handbook", pp. 578 to 588.

Primary Examiner—Raymond F. Cardillo
Assistant Examiner—Hoa T. Nguyen
Attorney, Agent, or Firm—Antonelli, Terry & Wands

[57] ABSTRACT

A method and device for recording pre-pits on an optical recording medium by projecting a modulated optical beam onto the recording medium. A formatter signal source provides an output waveform which is divided into a plurality of separate signal waveforms different in time from one another and each of the separate signal waveforms is superposed with a different carrier frequency. The superposed signals are supplied to an acoustic-optic modulator for modulating the optical beam which is projected onto the recording medium for forming pre-wobbled pre-pits thereon.

10 Claims, 2 Drawing Sheets

WOBBLED PIT RECORDING METHOD AND DEVICE OF OPTICAL RECORDING MEDIUM UTILIZING A PLURALITY OF TIME DIFFERENT SIGNAL WAVEFORMS

BACKGROUND OF THE INVENTION

The present invention relates to the method and the device for pre-recording information such as track-address and sector address on the read/write optical disk.

The optical disk capable of reading/writing which is commonly used today has pre-grooves and sector marks (tracking information, sector address, etc.) written beforehand along the rotation surface on the disk, and read/write of the data pit which is additionally recorded, for example, by a user is preformed based on these pre-grooves and sector marks. The disk having these pre-grooves and sector marks is now reproduced and manufactured with a sort of mold called a stamper, by using the process which is similar to that in manufacturing popularly-used audio disks. The disks manufactured in this process are called replica disks. There has been proposed a production method of writing the pre-grooves and sector marks by light beams on every single disk; what is called a servo write system. Thus the optical disk now generally used is of depth phase structure that has two kinds of depth; the sector marks have a depth of $\lambda/4$ and the pre-grooves have $\lambda/8$.

However, the optical disk which has a structure with two different kinds of depth as mentioned above is not easy to manufacture by using the servo write system.

Accordingly, there has been made a proposal by the present inventor and others with reference to a record-/reproduction optical disk that does not require the above-said pre-groove or two different-depth structure.

This system is described in the Japanese Patent Application Laid Open No. 91537/1983, corresponding to U.S. Pat. No. 4,541,082 or German Patent Application No. 3243685.8, and the following is the general outline of the system.

In this system, a servo area (which is equivalent to the area of the above-mentioned sector marks) is formed for recording tracking information to which more than two pits are intermittently provided previously along the tracks and subsequently to this servo area, a data area (which is the area to which, for example, a user makes an additional record as previously stated, and which therefore has no record written in) is provided for recording the data pit.

The servo area and the data area constitute a single sector, and a large number of such sectors lying in a line comprise tracks. In recording the data pits, the system performs tracking based on tracking information which is obtained from the pre-pits (on which information such as tracking information and sector addresses is written) pre-written in the servo area. In the data area, the system records the data pits while holding the tracking information obtained from the servo area.

In addition, the system for detecting tracking information transmitted from the pre-pits which are written in the servo area here does not employ a Push-Pull system, but uses what is called a heterodyne system. There have been proposed a variety of circuit systems in this detection system. Such circuit systems are described, for example, in the Japanese Patent Application Laid Open No. 91538/1983 corresponding to U.S. Pat. No. 4,541,082, Japanese Patent Application Laid Open No. 93222/1977 corresponding to U.S. Pat. No. 4,057,833, etc. This heterodyne system is characterized in that tracking information can be obtained if the pits is of $\lambda/4$ depth phase structure or of black and white structure (amplitude structure).

SUMMARY OF THE INVENTION

The object of the present invention is to provide a process and a device for manufacturing a proper optical disk which, so as to record the afore-mentioned pre-pits, is devised to perform tracking on the basis of the tracking information obtained from the pre-pits of the servo area, without utilizing pre-grooves.

The present invention, in order to achieve the above-mentioned object, is characterized in that the device is engineered to record the pre-pits at constantly spaced intervals and also by minutely wobbling the pits in the disk radius direction.

Moreover, the present invention is characterized in that the device is designed to form the pre-pits by accurately wobbling the minute amplitude fraction of a pulse light while pulse modulating a laser beam with one of light elements without causing any time delay to the specific pulse light.

DETAILED DESCRIPTION OF PREFERRED EMBODIMENT

Figure 1:
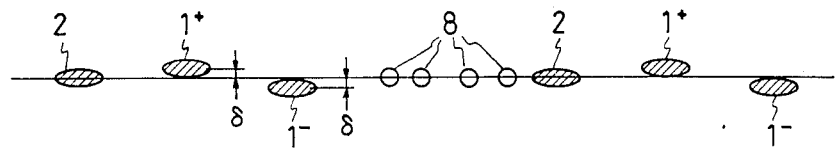
FIG. 1 indicates the shape of the pre-pits which are formed on the optical disk surface by means of the present invention.

FIG. 1 indicates the configuration of the pre-pits which are formed on the optical disk surface in the present invention.

Figure 2:
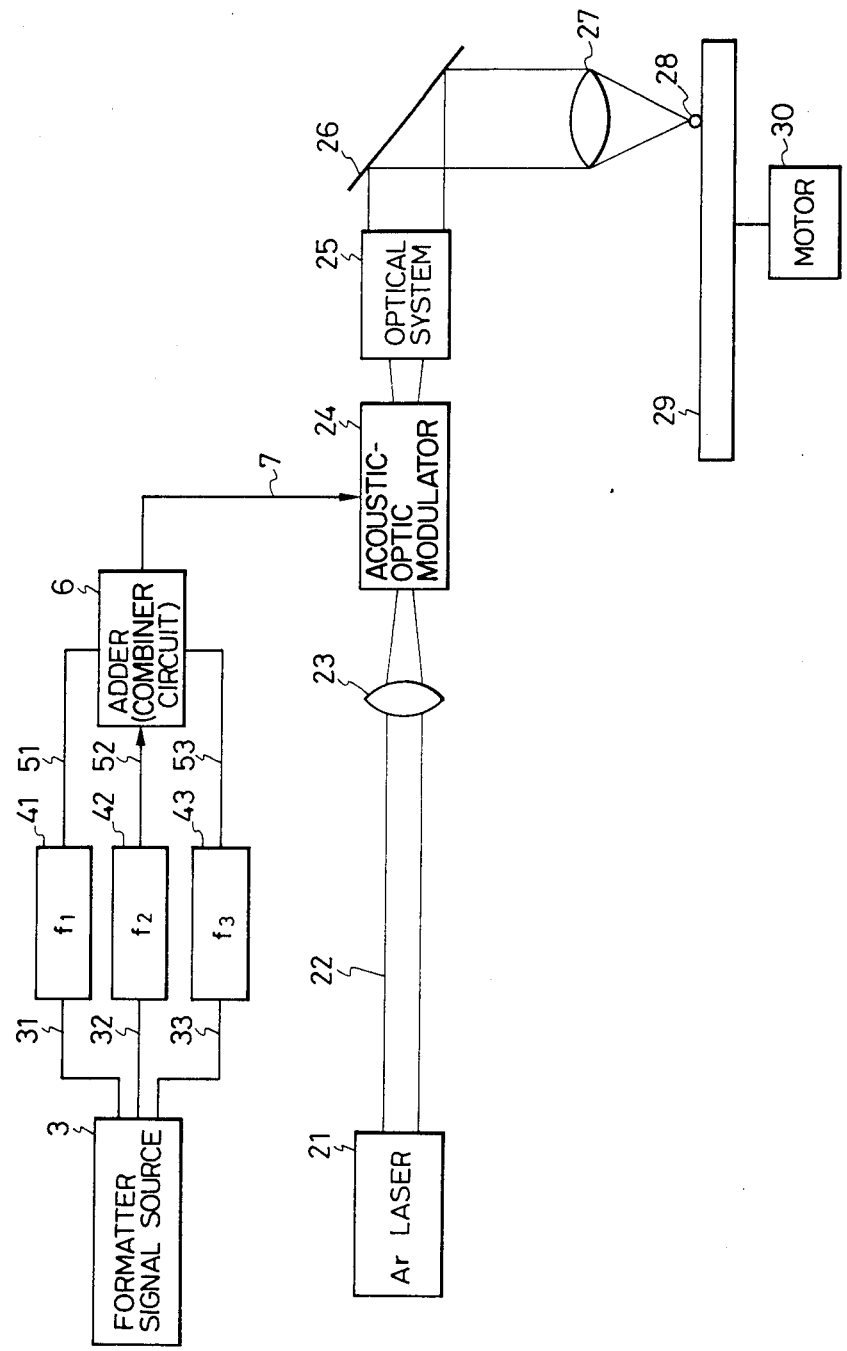
FIG. 2 illustrates the constitution of the optical disk recording device of the present invention.

FIG. 2 shows the structure of the one of the typical examples for the optical disk device relating to the present invention.

In FIGS. 1, 2, 1+ and 1− denote the pits used for optical tracking and synchronizing of the optical beam at the time of recording and reproducing by a user. Reference numeral 8 indicates data pits to which, for example, a user makes an additional recording. The line of pits 2, 1+, and 1−, which serve for tracking and synchronizing, are composed of the pre-pits (hereinafter referred to as "tracking mark pit") 1 (1+ and 1−) for detecting tracking errors which are pre-recorded after being pre-wobbled relative to the tracking advance direction in pairs of minute amplitudes $+\delta$ and $-\delta$; and the sector mark pre-pits (hereinafter called "sector mark-pit") 2 for detecting the location of pre-pit 1 which is intended for detecting the said tracking errors. This sector mark pit 2 is not pre-wobbled.

The characteristics of the optical disk in this case are as follows:

That is to say, in the case of the additional recording of data by a user, the light spot deviated from the track center can be detected by employing the pre-wobbling process which is disclosed in the Japanese Patent Application Laid Open No. 103515/1984, and the U.S. Pat. No. 4,223,187, and German Patent No. 2404927.

This type of pre-wobbling-process will be found difficult to carry out for optical pre-wobbling at a substantially high rate (for example, at about 1 MHz) and for pre-wobbling requiring high accuracy (for example, at an amplitude δ of 0.2 μm and its position accuracy stands at ±0.01 μm).

Therefore the present invention has been accomplished so as to put the above requisites into practical use with ease.

That is, the present invention is characterized in that the pre-pits are designed to be formed by wobbling the laser beam using a single modulator.

The example actually implemented for the recording device regarding the present invention, which is to prepare the pre-pits described above, is illustrated by using FIG. 2.

Laser beam 22 emanated from a recording-Ar-laser 21 is condensed on a spot, for example, 0.1 mm φ by a condensing lens 23, so as to provide the desired frequency responsive properties for an acoustic-optic modulator 24 which utilizes, for example, tellurium oxide or lead molybdate crystal. The laser beam can be modulated at a rate of, for example, 10 MHz. Laser beam 22 is modulated by a formatter-signal 7 which is a signal added by adder (for example, combiner circuit) 6, when passing through the acoustic-optic modulator 24 due to ultrasonic waves.

In addition, the laser beam as described above, and rendered a parallel beam by an optical system 25, is reflected by mirror 26 and finally condensed into a minute spot of approx. 0.5 μm onto the rotating disk 29 surface by means of object lens 27.

Disk 29 is rotated by motor 30. Optical spot 28 and disk 29 are relatively shifted at high accuracy, so that the pre-pit line formed by said spot 28 may be intermittently arrayed along the spiral-shaped or the concentric circle-shaped track.

The explanation below is given on the operations other than drive circuits 41 to 43 which drive acoustic-optic modulator 24 used for accurately pre-wobbling the above-mentioned pre-pits which have previously explained in FIG. 1.

Figure 3A:
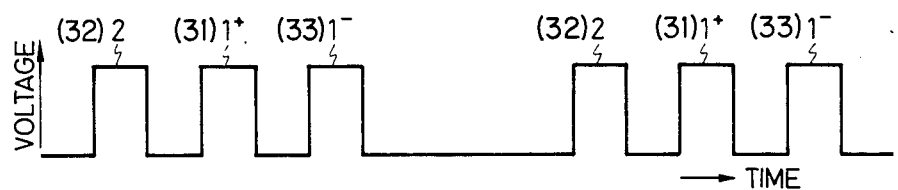
FIGS. 3(a)–3(d) show waveforms of three modulation signals, which shape the format signals for the output waveforms of a modulation signal source and tracking mark pre-pits with regard to the present invention.
Figure 3B:
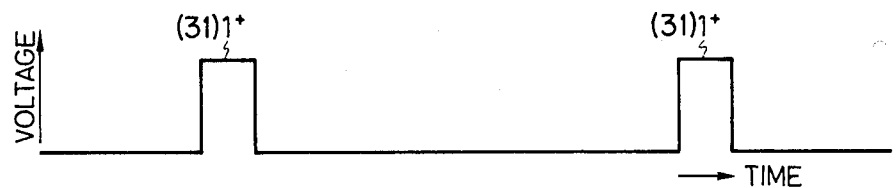
Figure 3C:
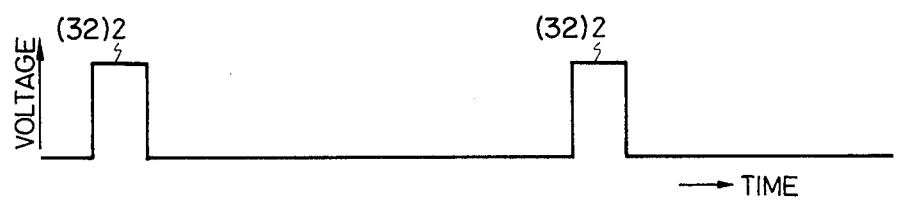
Figure 3D:
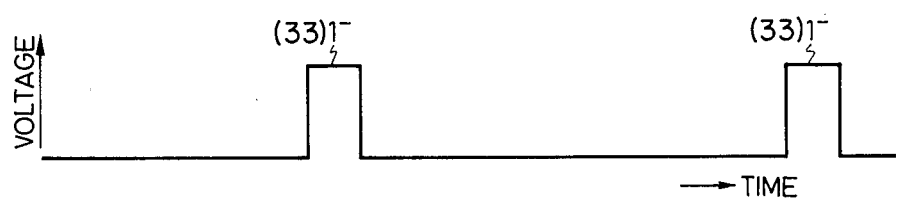

In other words, output signals of a formatter signal source 3 having combined rectangular pulse signal waveforms as shown in FIG. 3(a) are divided in terms of time into rectangular pulse signals 31, 32, and 33 which are waveforms different in time outputted by the formatter signal source 3 as shown in FIG. 3(b), FIG. 3(c), and FIG. 3(d), respectively.

That is to say, signal 31 illustrated in FIGS. 2 and 3 causes the pre-pit to wobble in the plus direction so as to form only pit $1^+$. Signal 32 does not cause the pre-pit to wobble and is composed only of sector mark pit 2, while signal 33 permits the pre-pit to wobble in the minus direction and forms pit $1^-$. In this way, original signal source 3 is resolved in terms of time into signals 31, 32, and 33, respectively, and consequently the respective signals are inputted to acoustic-modulator drivers 41, 42, and 43 which oscillate each of these signals at different carrier frequencies $f_1$, $f_2$, and $f_3$. As a result, output signals 51, 52, and 53 of the drivers 41, 42, and 43 are devised to be created in the manner that carrier frequency $f_1$ is superposed with signal 31; likewise, carrier frequency $f_2$ by signal 32, and carrier frequency $f_3$ by signal 33. Output signals 51, 52, and 53 transmitted from driver circuits 41, 42, and 43 are added by adder 6. The signal 7 thus added is inputted to acoustic-optic modulator 24, with the result that laser beam 22 will be subjected to modulation. The definite values of carrier frequencies $f_1$, $f_2$, and $f_3$ are, for example;

$$\Delta f = f_2 - f_1 = f_3 - f_2$$

Central carrier frequency $f_2$ will be determined by the characteristics, depended on mainly frequency characteristics, depended on mainly frequency characteristics, or acoustic-optic modulator 24, and a formula $$f_2 = 250 \text{ MHz}$$

will be pragmatic. Also $\Delta f$ is in proportion to minute displacement quantity δ, which is pre-wobbled, of the tracking mark as shown in the following formula:

$$\Delta f = K \cdot \delta, \text{ where } K = constant$$

K is a constant which is determined by the wave length of laser beam 22, the crystal material of acoustic-optic modulator 24, and the focal distance of the object lens 27. For example, $$\Delta f = 30\delta$$

Δf will be a unit of (MHz) and equally δa unit of (μm). For example, assuming that δ is equal to 0.1 μm, Δf will be equal to 3 MHz, thereby bringing the carrier frequency of drivers 41, 42, and 43 to be 253 MHz, 250 MHz, and 247 MHz. Thus sector mark pit 2 is not deviated, becoming δ=0. Pit $1^+$ among pre-pits 1 for detecting the tracking error is minutely deviated in the plus direction, into δ=0.1 μm; pit $1^-$ is minutely deviated in the minus direction, forming a formula δ=−0.1 μm, thereby causing the pit to be pre-wobbled and to be recorded.

According to the present invention which is useful in the following point: minute optical deflection is intermittently performed by using a single modulator, which enables the specific pulse light to be wobbled at high accuracy for the minute amplitude fraction without delay in time, thereby permitting the realization of the optical disk capable of tracking at high accuracy by means of servo sector system.

The process and the device illustrated in the present invention is applicable to the disk in either case where the pre-pit is of λ/4 depth phase structure, or case where the pre-pit is of black and white structure (amplitude structure).

The illustration is given in FIG. 3 that the width of the modulation signal waveforms is made the same, which is to form sector mark pit 2 and tracking mark pit 1 ($1^+$ and $1^-$), respectively. Rendering the respective waveforms mentioned above different in width will be made convenient for the discrimination of the types of such waveforms.

What is claimed is:

1. A recording method for an optical recording medium on which a pre-pit is recorded by projecting an optical beam modulated by a pre-pit recording signal, comprising the steps of:
    dividing output waveforms from a formatter signal source into a plurality of separate signal waveforms different in time from one another;

superposing each of the plurality of separate signal waveforms with a different carrier frequency and providing signal outputs indicative thereof;

modulating the optical beam by the superposed signal outputs; and projecting the optical beam onto the recording medium for forming pre-wobbled pre-pits by the modulated optical beam.

2. A recording method according to claim 1, wherein the step of dividing includes dividing the output waveforms of the formatter signal source into three separate signal waveforms different in time from one another.

3. A recording method according to claim 1, wherein the step of superposing includes providing acoustic signal waves different in carrier frequency from one another, and the step of modulating the optical beam includes utilization of an acoustic-optic modulator.

4. A recording method according to claim 1, wherein the step of modulating the optical beam includes adding the separate superposed signal outputs for providing an added signal output thereof and utilizing the added signal output for modulation.

5. A recording method according to claim 1, wherein the optical recording medium is an optical disc.

6. A recording device for an optical recording medium comprising:

formatter signal source means for providing an output waveform and including means for dividing the output waveform into a plurality of separate signal waveforms different in time from one another and providing outputs of the separate signals;

driver means for superposing each of said plurality of separate signals by acoustic signal waves different in carrier frequency from one another for providing superposed signal outputs;

acoustic-optic modulator means for modulating an optical beam by the superposed signal outputs of the driver means and providing a modulated optical beam; and means for projecting the modulated optical beam onto the optical recording medium for forming pre-wobbled pre-pits thereon.

7. A recording device according to claim 6, wherein the dividing means divides the output signal waveform into three separate signal waveforms different in time from one another.

8. A recording device according to claim 6, wherein the modulator driver means includes means for adding the plurality of separate superposed signals so as to provide an added signal thereof, the acoustic-optic modulator means being responsive to the added signal for modulating the optical beam therewith.

9. A recording device according to claim 6, wherein the driver means comprises a plurality of drivers having different carrier frequencies from one another.

10. A recording device according to claim 6, wherein the means for projecting the modulated optical beam onto the recording medium includes an optical system for converting the modulated optical beam into a parallel beam.

* * * * *